United States Patent
Mayer et al.

(10) Patent No.: US 6,566,434 B1
(45) Date of Patent: May 20, 2003

(54) VINYL AROMATIC-1,3-DIENE COPOLYMERS STABILIZED WITH PROTECTION COLLOIDS USED FOR MODIFYING MATERIALS CONTAINING PLASTER OR CALCIUM CARBONATE

(75) Inventors: Theo Mayer, Julbach (DE); Peter Fritze, Haiming (DE); Reinold Härzschel, Burghausen (DE); Hans-Peter Weitzel, Reischach (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/806,022

(22) PCT Filed: Oct. 14, 1999

(86) PCT No.: PCT/EP99/07707

§ 371 (c)(1), (2), (4) Date: Mar. 23, 2001

(87) PCT Pub. No.: WO00/30991

PCT Pub. Date: Jun. 2, 2000

(30) Foreign Application Priority Data

Nov. 19, 1998 (DE) .......................... 198 53 450

(51) Int. Cl.⁷ .............. C08J 3/00; C08K 3/30; C08K 3/26; C08L 25/04; B05D 3/02
(52) U.S. Cl. .............. 524/425; 427/393.6; 524/423
(58) Field of Search ................ 524/425, 423; 427/393.6

(56) References Cited

U.S. PATENT DOCUMENTS

| 4,851,047 A | 7/1989 | Demlehner et al. |
| 5,702,828 A | 12/1997 | Adler et al. |
| 6,258,890 B1 * | 7/2001 | Schmidt-Thuemmes et al. |

FOREIGN PATENT DOCUMENTS

| DE | 37 04 439 | 8/1988 |
| EP | 0 320 982 | 6/1989 |
| EP | 0 477 900 | 4/1992 |
| EP | 0 728 715 | 8/1996 |
| FR | 2 348 898 | 11/1977 |
| JP | 57 205352 | 12/1982 |
| JP | 5-836 | 1/1993 |
| WO | WO 99/16794 | 4/1999 |
| WO | WO 99/28360 | 6/1999 |

OTHER PUBLICATIONS

Derwent Abstract corresponding to EP 0 320 982 [AN 1989–179851].
Derwent Abstract corresponding to EP 0 477 900 [AN 1992–1062296].
Patent Abstract of Japan corresponding to JP 5–836.
Derwent Abstract corresponding to JP 57–205352 [AN 1983–40505K].
Derwent Abstract corresponding to WO 99/28360 [AN 1999–358110].
Derwent Abstract corresponding to WO 99/16794 [AN 1999–2550607].
Derwent Abstract corresponding to FR 2 348 898 [AN 1978–10807].
Fox T.G., Bull. Am. Physics Soc. 1, 3, p. 123 (1956).
Polymer Handbook, $2^{nd}$ Edition, J. Wiley & Sons, New York (1975).

* cited by examiner

*Primary Examiner*—Patrick D. Niland
(74) *Attorney, Agent, or Firm*—Brooks & Kushman P.C.

(57) ABSTRACT

The vinyl aromatic-1,3-diene copolymers stabilized with protection colloids are used in the form of aqueous polymer dispersions or water-redispersible polymer powders for modifying materials that contain plaster or calcium carbonate. The polymer dispersions or polymer powders are obtained by the emulsion-polymerization of a mixture containing at least one vinyl aromatic and at least one 1,3-diene in the presence of at least one protection colloid and without any emulsifier, and by optionally drying the aqueous polymer dispersions thus obtained.

19 Claims, No Drawings

VINYL AROMATIC-1,3-DIENE COPOLYMERS STABILIZED WITH PROTECTION COLLOIDS USED FOR MODIFYING MATERIALS CONTAINING PLASTER OR CALCIUM CARBONATE

BACKGROUND OF THE INVENTION

1) Field of the Invention

The invention relates to the use of protective colloid-stabilized vinylaromatic-1,3-diene copolymers in the form of their aqueous polymer dispersions or polymer powders which are redispersible in water for the modification of gypsum-based materials or of materials based on calcium carbonate.

2) Background Art

Gypsum is a building material which is available in large quantities at low cost. Apart from naturally occurring forms of gypsum, considerable amounts of gypsum are obtained from flue gas desulfurization plants and there is worldwide interest in utilizing these. Apart from the use of gypsum in jointing compositions, gypsum mortars are used, in particular, for interior plasters and coatings. Since gypsum cures with an increase in volume, it is the ideal binder for coatings and moldings in order to avoid possible crack formation. However, owing to their water-sensitivity which is reflected, inter alia, in an unsatisfactory freezing/thawing behavior, renders comprising plaster of Paris as binder, with or without proportions of builder's lime, may, according to DIN standard 18550, be used only for interior plasters subject to stresses customary for these, but not for damp rooms or for external renders. In order to be able to use gypsum-based building materials for external applications and wet applications, too, they have to be sufficiently hydrophobicized.

In DE-A 3704439 (U.S. Pat. No. 4,851,047), the use of silicones and siloxanes, steareates and paraffin waxes is proposed for hydrophobicizing gypsum mortars. EP-A 320982 describes the use of redispersion powders based on vinyl acetate-Versatic acid-vinyl ester copolymers for hydrophobicizing gypsum-based materials. EP-A 477900 discloses the use of dispersible powder compositions based on vinyl ester polymers or styrene-acrylate polymers as additives for improving mechanical properties such as adhesion, abrasion resistance and flexural strength in gypsum, building adhesives and mortars. EP-A 728715 recommends the use of compositions of dispersible powders and thixotropic additives for hydrophobicizing gypsum, with the dispersible powders recommended being ones based on vinyl acetate copolymers and on styrene-acrylate copolymers.

JP-A 5/836 (Derwent Abstract AN 93-49422) describes the hydrophobicization of cement and gypsum by means of a pulverulent mixture of polysiloxane and a copolymer of vinylaromatics, dienes and/or acrylates. JP-A 57/205352 (Derwent Abstract AN 83-10505K) describes the production of water-resistant gypsum moldings by addition of polymer latices of acrylate, styrene, vinyl ester and epoxy resins to the gypsum mortar and subsequent heat treatment to cure the moldings.

A disadvantage of the previously mentioned hydrophobicizing agents is their not negligible hydrophilicity, for example in the case of vinyl ester or acrylic ester polymers, which leads to a low water resistance. In the abovementioned Japanese publications, the emulsifier content of the latices employed leads to increased water absorption. This can be improved by the addition of additives such as siloxanes, but only within certain limits. In many cases, the mechanical strength obtained in the hydrophobicization is also unsatisfactory.

SUMMARY OF THE INVENTION

It is therefore an object of the invention to provide a composition for the hydrophobicization of gypsum-based materials and of materials based on calcium carbonate, which leads to hydrophobicized materials having a high water resistance and high mechanical strength without further additives.

The invention provides for the use of protective colloid-stabilized vinylaromatic-1,3-diene copolymers in the form of their aqueous polymer dispersions or polymer powders which are redispersible in water for the modification of gypsum-based materials or of materials based on calcium carbonate, wherein the polymer dispersions or polymer powders are obtained by emulsion polymerization of a mixture comprising at least one vinylaromatic and at least one 1,3-diene, in the presence of one or more protective colloids and in the absence of emulsifiers, and, if desired, drying of the aqueous polymer dispersions obtained in this way.

DESCRIPTION OF THE PREFERRED EMBODIMENTS

Suitable vinylaromatics are styrene and methylstyrene; preference is given to copolymerizing styrene. Examples of 1,3-dienes are 1,3-butadiene and isoprene; preference is given to 1,3-butadiene. In general, the copolymers comprise from 20 to 80% by weight, preferably from 30 to 70% by weight, of vinylaromatic and from 20 to 80% by weight, preferably from 30 to 70% by weight, of 1,3-diene. Further monomers may also be present if desired, and the percentages quoted in each case add up to 100% by weight.

If desired, up to 30% by weight, based on the total weight of the monomer phase, of further monomers which can be copolymerized with vinylaromatics and 1,3-dienes, e.g. ethylene, vinyl chloride, (meth)acrylic esters of alcohols having from 1 to 15 carbon atoms or vinyl esters of unbranched or branched carboxylic acids having from 1 to 15 carbon atoms, may be additionally present in copolymerized form.

If desired, from 0.05 to 10% by weight, based on the total weight of the monomer mixture, of auxiliary monomers may be additionally present in copolymerized form. Examples of auxiliary monomers are ethylenically unsaturated monocarboxylic and dicarboxylic acids, preferably acrylic acid, methacrylic acid, fumaric acid and maleic acid; ethylenically unsaturated carboxamides and nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or their salts, preferably vinylsulfonic acid, 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or after-crosslinking comonomers, for example acrylamidoglycolic acid (AGA), methyl methylacrylamidoglycolate (MAGME), N-methylolacrylamide (NMA), N-methylolmethacrylamide, N-methylol(allyl carbamate), alkyl ethers such as the isobutoxy ethers or esters of N-methylolacrylamide, of N-methylolmethacrylamide and of N-methylol(allyl carbamate). Also suitable are epoxyfunctional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkoxysilanes and vinylmethyldialkoxysilanes, where alkoxy groups present can be, for example, ethoxy and ethoxypropylene glycol ether radicals. Mention may also be made of monomers containing hydroxy or CO groups, for example hydroxyalkyl methacrylates and hydroxyalkyl acrylates, e.g. hydroxyethyl, hydroxypropyl or hydroxybutyl acrylate or methacrylate, and also compounds such as diacetoneacrylamide and acetylacetoxyethyl acrylate or methacrylate.

The choice of monomers or the choice of the proportions by weight of the comonomers is made so that, in general, a glass transition temperature $T_g$ of from −70° C. to +100° C., preferably from −50° C. to +50° C., particularly preferably from −20° C. to +40° C., results. Preference is given to copolymerizing styrene and 1,3-butadiene in the ratios mentioned without further comonomers. The glass transition temperature $T_g$ of the polymers can be determined in a known manner by means of differential scanning calorimetry (DSC). The $T_g$ can also be calculated approximately beforehand by means of the Fox equation. According to Fox T. G., Bull. Am. Physics Soc. 1, 3, page 123 (1956): $1/T_g = x_1/T_{g1} + x_2/T_{g2} + \ldots + x_n/T_{gn}$, where $x_n$ is the mass fraction (% by weight/100) of the monomer n, and $T_{gn}$ is the glass transition temperature in degrees Kelvin of the homopolymer of the monomer n. $T_g$ values for homopolymers are listed in Polymer Handbook 2nd Edition, J. Wiley & Sons, New York (1975).

Suitable protective colloids are, for example, polyvinyl alcohols, polysaccharides in water-soluble form, e.g. starches (amylose and amylopectin), modified starches such as starch ethers, for example hydroxy-alkyl ether starches, dextrins and cyclodextrins, celluloses and their carboxymethyl, methyl, hydroxyethyl or hydroxypropyl derivatives, poly(meth)acrylic acid, poly(meth)acrylamide, melamine formaldehyde sulfonates and naphthalene formaldehyde sulfonates.

Preference is given to polyvinyl alcohols having a degree of hydrolysis of from 80 to 95 mol % and a Höppler viscosity in 4% strength aqueous solution of from 1 to 30 mPas (Höppler method at 20° C., DIN 53015). Also suitable are hydrophobically modified polyvinyl alcohols having a degree of hydrolysis of from 80 to 95 mol % and a Höppler viscosity in 4% strength aqueous solution of from 1 to 30 mpas. Examples of such polyvinyl alcohols are partially saponified copolymers of vinyl acetate with hydrophobic comonomers such as isopropenyl acetate, vinyl pivalate, vinyl ethyl-hexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, olefins such as ethene and decene. The proportion of hydrophobic units is preferably from 0.1 to 10% by weight, based on the total weight of the partially saponified polyvinyl acetate, with the hydrophobically modified polyvinyl alcohols producing a surface tension of <40 mN/m in 2% strength aqueous solution. It is also possible to use mixtures of the polyvinyl alcohols mentioned.

Particular preference is given to the partially saponified polyvinyl acetates comprising vinyl alcohol units and units of vinyl esters of alpha-branched carboxylic acids having 5 or from 9 to 11 carbon atoms in the specified amounts. Examples of such vinyl esters are those sold as Versatic acid vinyl esters by Shell under the trade names VeoVa$^R$5, VeoVa$^R$9, VeoVa$^R$10 and VeoVa$^R$11. Further suitable polyvinyl alcohols are partially saponified, hydrophobicized polyvinyl acetates which are obtained by polymer-analogous reaction, for example acetalization of the vinyl alcohol units by means of $C_1$–$C_4$-aldehydes such as butyraldehyde. The proportion of hydrophobic units is preferably from 0.1 to 10% by weight, based on the total weight of the partially saponified polyvinyl acetate. The degree of hydrolysis is from 80 to 95 mol %, preferably from 85 to 94 mol %, and the Höppler viscosity (DIN 53015, Höppler method, 4% strength aqueous solution) is from 1 to 30 mPas, preferably from 2 to 25 mPas.

The greatest preference is given to polyvinyl alcohols having a degree of hydrolysis of from 85 to 94 mol % and a Höppler viscosity in 4% strength aqueous solution of from 2 to 25 mpas (Höppler method at 20° C., DIN 53015) and their combinations with the abovementioned hydrophobically modified polyvinyl esters in a weight ratio of from 10/1 to 1/10. The protective colloids mentioned can be obtained by means of methods known to those skilled in the art.

The protective colloid-stabilized polymer dispersions are prepared by the emulsion polymerization process, with the polymerization temperature generally being from 40° C. to 100° C., preferably from 60° C. to 90° C. In the copolymerization of gaseous comonomers such as ethylene or vinyl chloride, the polymerization can also be carried out under superatmospheric pressure, generally in the range from 5 bar to 100 bar. The polymerization is initiated using the initiators or redox initiator combinations customary for emulsion polymerization, for example hydroperoxides such as tert-butyl hydroperoxide, azo compounds such as azobisisobutyronitrile, inorganic initiators such as the sodium, potassium and ammonium salts of peroxodisulfuric acid. The initiators mentioned are generally used in an amount of from 0.05 to 3% by weight, based on the total weight of monomers. As redox initiators, use is made of combinations of the abovementioned initiators with reducing agents such as sodium sulfite, sodium hydroxymethanesulfinate or ascorbic acid. The amount of reducing agent is preferably from 0.01 to 5.0% by weight, based on the total weight of monomers.

The polymerization mixture is stabilized by means of the abovementioned protective colloids without additional emulsifiers. Preferably, some of the protective colloid is included in the initial charge and some of it is metered in after initiation of the polymerization. In general, the polymerization is carried out in the presence of from 1 to 25% by weight of protective colloid, based on the total weight of monomers. It is possible for all of the monomers to be charged initially, for all of them to be metered in or for part of them to be initially charged and the remainder metered in after initiation of the polymerization. A suitable method of preparing the polymer dispersions is described, for example, in the PCT application PCT/EP98/06102, whose disclosure in this respect is incorporated by reference into the present application.

After conclusion of the polymerization, an after-polymerization can be carried out using known methods to remove residual monomers, for example by means of after-polymerization initiated using a redox catalyst. Volatile residual monomers can also be removed by means of distillation, preferably under reduced pressure, and, if desired, by passing inert entraining gases such as air, nitrogen or steam through or over the polymerization product. The aqueous dispersions obtainable in this way generally contain from 1 to 25% by weight of protective colloid, based on the polymer, and have a solids content of from 30 to 75% by weight, preferably from 40 to 65% by weight.

To prepare polymer powders which are redispersible in water, the aqueous dispersions are dried, for example by means of fluidized-bed drying, freeze drying or spray drying. The dispersions are preferably spray dried. Spray drying is carried out in customary spray drying units, and atomization can be carried out by means of single-fluid, two-fluid or multifluid nozzles or by means of a rotating disk. The outlet temperature is generally chosen in the range from 55° C. to 100° C., preferably from 70° C. to 90° C., depending on the unit, the $T_g$ of the resin and the desired degree of drying.

The total amount of protective colloid prior to the drying procedure is preferably at least 10% by weight, based on the polymer. To ensure redispersibility, it is generally necessary to add further protective colloids as atomization aid to the dispersion prior to drying. In general, the proportion of protective colloid prior to atomization of the dispersion is from 5 to 25% by weight, based on the polymer.

Suitable atomization aids are partially saponified polyvinyl acetates; polyvinylpyrrolidones; polysaccharides in water-soluble form, e.g. starches (amylose and amylopectin), modified starches such as starch ethers, for example hydroxyalkyl ether starches; celluloses and their carboxymethyl, methyl, hydroxyethyl, hydroxypropyl derivatives; proteins such as casein or caseinate, soya protein, gelatin; ligninosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthalene formaldehyde sulfonates, styrene-maleic acid and vinyl ether-maleic acid copolymers. Preferred atomization aids are partially saponified polyvinyl acetates having a degree of hydrolysis of from 80 to 95 mol % and a Höppler viscosity of from 1 to 30 mPas, which may, if desired, have been hydrophobically modified as indicated above.

In the atomization, a content of up to 1.5% by weight of antifoam, based on the base polymer, has frequently been found to be useful. To prolong the shelf life by improving the caking stability, in particular in the case of powders having a low glass transition temperature, the powder obtained can be admixed with an anticaking agent, preferably in an amount of up to 30% by weight, based on the total weight of polymeric constituents. Examples of anticaking agents are calcium carbonate or magnesium carbonate, talc, gypsum, silica and silicates, preferably having particle sizes in the range from 10 nm to 10 μm.

To improve the use properties, further additives can be added in the atomization. Further constituents of dispersible powder compositions present in preferred embodiments are, for example, pigments, fillers, foam stabilizers, hydrophobicizing agents.

Among the types of gypsum plaster, preference is given to α- and β-hemihydrate ($CaSO_4$ 1/2 $H_2O$) in the form of, for example, builder's plaster, stucco plaster, hard plaster of Paris or modeling plaster. However, it is also possible to modify other types of calcium sulfate, for example flooring plaster, Keene's cement, dihydrate and anhydrite. The calcium sulfate obtained in flue gas desulfurization (FGD gypsum) is also well suited.

The gypsum plaster composition may further comprise the customary additives and modifiers. Customary additives for gypsum mortar are calcium hydroxide in an amount of preferably from 1 to 30% by weight and also inert fillers such as calcium carbonate, dolomite, clay minerals such as talc, mica, kaolin and/or quartz sand in customary amounts, preferably in amounts of from 5 to 90% by weight. The percentages by weight are in each case based on the total weight of the pulverulent gypsum plaster composition.

Modifiers which improve the processability of the calcium sulfate or calcium carbonate compositions or the properties of products manufactured therewith are, for example, salts of long-chain fatty acids such as calcium stearate, sodium oleate, silicone building protection compositions, fungicides, fibrous materials, accelerators such as dipotassium hydrogen sulfate, retarders such as tartrates, phosphates, protein derivatives, thickeners such as cellulose ethers, starch ethers, dextrins, bentonites.

The protective colloid-stabilized vinylaromatic-1,3-diene copolymer is generally used in an amount of from 0.2 to 15% by weight, based on the dry weight of the formulation. To modify the gypsum-based or $CaCO_3$-based materials, the dispersible powder or the dispersion is mixed in suitable mixers with the calcium sulfate or the calcium carbonate and possibly further additives and modifiers and the mixture is homogenized. Preference is given to preparing a dry composition by means of dispersible powders and adding the water necessary for processing at the building site prior to processing.

The compositions modified according to the invention are particularly suitable for use as gypsum mortars for knifing fillers, joint fillers, $CaSO_4$ flow screeds, jointing compositions, adhesive mortars or for use for producing plasterboards or plaster molds. Examples of further applications are plasters and renders or stucco work, including exterior applications. The usual applications for the correspondingly modified $CaCO_3$-based materials are joint fillers, gypsum-free knifing fillers and plasters and renders.

It has been found that hydrophobicization according to the invention significantly improves the mechanical properties of gypsum-based or $CaCO_3$-based materials, e.g. adhesive pull strength, flexural strength, compressive strength, abrasion resistance, water absorption, and thus the weathering resistance of knifing fillers.

The following examples serve to illustrate the invention:

Preparation of the Mortar Mixture:

In Examples 1 to 6, gypsum mortars or $CaCO_3$ mortars were prepared using the basic formulations 1 and 2 indicated in Tables 1 and 2. For this purpose, the constituents of the formulation were premixed dry, the appropriate amount of water was placed in a mortar mixer and the dry mix was stirred in.

TABLE 1

Basic formulation 1 (gypsum mortar)

| | | |
|---|---|---|
| 660 | parts by weight of | gypsum plaster (Primoplast) |
| 300 | " | $CaCO_3$ (Carborex 20) |
| 2 | " | cellulose ether (CulminalC8031) |
| 1 | " | starch ether (Amylotex7086) |
| 1 | " | potassium dihydrogen phosphate |
| 450 | " | water |

TABLE 2

Basic formulation 2 (CaCO₃ joint filler)

| 965 | " | CaCO₃ (Durcal 40) |
| 5 | " | cellulose ether (Walocel MKX) |
| 30 | " | styrene-1,3-butadiene copolymer |
| 400 | " | water |

COMPARATIVE EXAMPLE 1

60 parts by weight of an emulsifier-stabilized aqueous dispersion (solids content: 50%) of a styrene-1,3-butadiene copolymer having a styrene content of 65% by weight and a 1,3-butadiene content of 35% by weight were additionally mixed into the basic formulation 1, and 420 parts by weight instead of 450 parts by weight of water were used.

COMPARATIVE EXAMPLE 2

60 parts by weight of an emulsifier-stabilized aqueous dispersion (solids content: 50%) of a styrene-acrylate copolymer (45% by weight of styrene; 55% by weight of butyl acrylate) were additionally mixed into the basic formulation 1, and 420 parts by weight instead of 450 parts by weight of water were used. EXAMPLE 3

30 parts by weight of a dispersible powder based on a styrene-1,3-butadiene copolymer having a styrene content of 65% by weight and a 1,3-butadiene content of 35% by weight, which had been stabilized using 12% by weight of a partially hydrolyzed polyvinyl alcohol having a degree of hydrolysis of 88 mol % and a Höppler viscosity of 4 mPas, were additionally mixed into the basic formulation 1.

COMPARATIVE EXAMPLE 4

60 parts by weight of an emulsifier-stabilized aqueous dispersion (solids content: 50%) of a styrene-1,3-butadiene copolymer having a styrene content of 65% by weight and a 1,3-butadiene content of 35% by weight were additionally mixed into the basic formulation 2, and 370 parts by weight instead of 400 parts by weight of water were used.

COMPARATIVE EXAMPLE 5

60 parts by weight of an emulsifier-stabilized aqueous dispersion (solids content: 50%) of a styrene-acrylate copolymer (45% by weight of styrene; 55% by weight of butyl acrylate) were additionally mixed into the basic formulation 2, and 370 parts by weight instead of 400 parts by weight of water were used.

EXAMPLE 6

30 parts by weight of a dispersible powder based on a styrene-1,3-butadiene copolymer having a styrene content of 65% by weight and a 1,3-butadiene content of 35% by weight, which had been stabilized using 12% by weight of a partially hydrolyzed polyvinyl alcohol having a degree of hydrolysis of 88 mol % and a Höppler viscosity of 4 mPas, were additionally mixed into the basic formulation 2.

Use Tests:
Testing of the Adhesive Pull Strength:

To test the adhesive pull strength, the gypsum-based compositions or CaCO₃-based compositions from the examples were applied in a thickness of 5 mm to concrete slabs using templates. The concrete slabs with the applied mortars were stored under standard conditions of temperature and humidity for 10 days. One day before the date for testing, 6 test specimens were drilled from each slab using a drilling machine with an annular bit, diameter: 55 mm. Pull-off brackets were then adhesively bonded onto the test specimens using a 2-component adhesive. The adhesive pull strength was determined in accordance with DIN 18156 using a pull-off instrument from Herion and a load increase rate of 250 N/s. The mean values for the adhesive pull strength of the individual trials are shown in Tables 3 and 4.
Testing of the Processing Behavior:

The processing behavior on application of the gypsum- or CaCO₃-based compositions to the concrete slabs was evaluated subjectively using grades from 1 to 5, where "1" means "very good" and "5" means "poor". The results are shown in Tables 3 and 4.
Testing of the Hardness of the Gypsum Mortars:

The hardness of the gypsum mortars was evaluated subjectively using grades from 1 to 5 after expiry of the abovementioned 10 day storage time, with "1" meaning "very hard" and "5" meaning "very soft". The results are shown in Tables 3 and 4.
Testing of the Water Absorption (Water Droplet Test):

To test the water absorption (hydrophobicization), a drop of water having a volume of 0.5 ml was applied by means of a pipette to the surface of the gypsum mortar after expiry of the 10 day storage time and the time until the droplet had disappeared was determined. The results are shown in Tables 3 and 4.

TABLE 3

Results of tests using basic formulation 1
(gypsum mortar)

| Formulation | C. Ex. 1 [p. by wt.] | C. Ex. 2 [p. by wt.] | Ex. 3 [p. by wt.] |
| --- | --- | --- | --- |
| Primoplast | 660 | 660 | 660 |
| Carborex 20 | 300 | 300 | 300 |
| Culminal C 8031 | 2 | 2 | 2 |
| Amylotex 7086 | 1 | 1 | 1 |
| K(HPO₄)₂ | 1 | 1 | 1 |
| Water | 420 | 420 | 450 |
| Disp. powder/dispersion | 60 | 60 | 30 |
| Processing | 4 | 3 | 2 |
| Hardness (scratch test) | 3 | 2 | 1 |
| Adhesive pull strength [N/mm²] | 0.68 | 0.95 | 1.31 |
| Water droplet test [min] | 40 | 45 | 90 |

TABLE 4

Results of tests using basic formulation 2
(CaCO₃ joint filler)

| Formulation | C. Ex. 4 [p. by wt.] | C. Ex. 5 [p. by wt.] | Ex. 6 [p. by wt.] |
| --- | --- | --- | --- |
| Durcal 40 | 965 | 965 | 965 |
| Walocel MKX | 5 | 5 | 5 |
| Water | 370 | 370 | 400 |
| Disp. powder/dispersion | 60 | 60 | 30 |
| Processing | 4 | 3 | 2 |
| Hardness (scratch test) | 2 | 2 | 1 |
| Adhesive pull strength [N/mm²] | 0.42 | 0.53 | 1.04 |
| Water droplet test [min] | 45 | 52 | 110 |

The results in Tables 3 and 4 show that the protective colloid-stabilized styrene-butadiene copolymers are superior to those stabilized with emulsifier both in respect of processing and mechanical hardness and in respect of hydrophobicization, both when used in gypsum-based materials and when used in CaCO$_3$-based materials. The same applies when they are compared to conventional styrene-acrylate copolymers.

What is claimed is:

1. A method for the modification of gypsum-based materials or materials based on calcium carbonate to improve water resistance and mechanical strength which comprises admixing with said materials, protective colloid-stabilized vinylaromatic-1,3-diene copolymers in the form of their aqueous polymer dispersions or polymer powders which are redispersible in water, wherein the polymer dispersions or polymer powders are obtained by emulsion polymerization of a mixture comprising at least one vinylaromatic and at least one 1,3-diene, in the presence of at least one protective colloid and in the absence of emulsifiers, and, optionally drying the aqueous polymer dispersions prior to mixing with said materials, 2. The modified materials obtained by the method of claim 1.

3. The modified material of claim 2 which is a gypsum-based material.

4. The modified material of claim 2 which is based on calcium carbonate.

5. The method as claimed in claim 1, wherein from 20 to 80% by eight of styrene as vinylaromatic and from 20 to 80% by weight of 1,3-butadiene as 1,3-diene are polymerized in the presence or absence of further comonomers.

6. The method as claimed in claim 1, wherein protective colloids used are one or more polyvinyl alcohols, starches, modified starches such as starch ethers, dextrins and cyclodextrins, celluloses and their carboxymethyl, methyl, hydroxyethyl or hydroxypropyl derivatives, poly(meth) acrylic acid, poly(meth)acrylamide, melamine formaldehyde sulfonates and naphthalene formaldehyde sulfonates.

7. The method as claimed in claim 1, wherein the protective colloids used are one or more unmodified or hydrophobically modified polyvinyl alcohols having a degree of hydrolysis of from 80 to 95 mol % and a Höppler viscosity in 4% strength aqueous solution of from 1 to 30 mpas.

8. The method as claimed in any of claims 1 and 5 to 7, wherein the protective colloid-stabilized vinylaromatic-1,3-diene copolymers in the form of their aqueous polymer dispersions or polymer powders which are redispersible in water are used in gypsum mortars for knifing fillers, joint fillers, CaSo$_4$ flow screeds, jointing compositions and adhesive mortars.

9. The method as claimed in any of claims 1 and 5 to 7, wherein the protective colloid-stabilized vinylaromatic-1,3-diene copolymers in the form of their aqueous polymer dispersions or polymer powders which are redispersible in water are used for producing plasterboards or plaster molds.

10. The method as claimed in any of claims 1 and 5 to 7, wherein the protective colloid-stabilized viylaromatic-1,3-diene copolymers in the form of their aqueous polymer dispersions or polymer powders which are redispersible in water are used in plasters or renders or stucco work.

11. The method as claims in any of claims 1 and 5 to 7, wherein the protective colloid-stabilized vinylaromatic-1,3-diene copolymers in the form of their aqueous polymer dispersions or polymer powders which are redispersible in water are used in joint fillers, gypsum-free knifing fillers and plasters and renders.

12. A process for filling a joint in a wall surface or coating a wall surface of a building structure with a settable gypsum- or calcium carbonate-based composition exhibiting improved resistance to damage by water following setting of the settable composition, said process comprising providing a settable composition comprising gypsum, calcium carbonate, or a mixture thereof, adding to said settable composition from 0.2 to about 15 percent by weight of a solid polymer additive, said percent by weight based on the total dry weight of the combination of polymer additive and settable composition, to form a polymer-modified settable composition, said solid polymer additive in the form of an aqueous polymer dispersion or a redispersible polymer powder, said polymer of said polymer additive comprising a polymer of styrene and butadiene prepared in the presence of a colloidal stabilizer, and free of emulsifiers;

applying said polymer modified settable composition to a joint or to a wall surface; and allowing said polymer modified settable composition to set at ambient temperature.

13. The process of claim 12 wherein said wall surface is an exterior surface of said building structure.

14. The process of claim 12, wherein said wall structure is an interior surface of said building structure which is exposed to dampness.

15. The process of claim 12, wherein said colloidal stabilizer comprises a polyvinyl alcohol having a degree of hydrolysis of from 85 to 94 mol percent and a Höppler viscosity in 4 weight percent aqueous solution of from 2 to 25 mPa·s measured in accordance with DIN 53015.

16. The process of claim 12, wherein said colloidal stabilizer comprises a partially saponified polyvinyl alcohol polymer comprising vinyl alcohol-derived units and units derived from vinyl esters of α-branched carboxylic acids having 5 carbon atoms or from 9 to 11 carbon atoms.

17. The process of claim 12, wherein said colloidal stabilizer comprises a hydrophobicized polyvinyl alcohol prepared by acetalization of a polyvinylalcohol by one or more $C_{1-4}$ aldehydes.

18. The process of claim 12, wherein said polymer modified settable composition is a plaster or stucco, optionally further comprising builder's lime.

19. The process of claim 12, wherein said polymer modified settable composition is a joint mortar, optionally further containing builder's lime.

* * * * *

UNITED STATES PATENT AND TRADEMARK OFFICE
CERTIFICATE OF CORRECTION

PATENT NO. : 6,566,434 B1
DATED : May 20, 2003
INVENTOR(S) : Theo Mayer et al.

It is certified that error appears in the above-identified patent and that said Letters Patent is hereby corrected as shown below:

Column 9,
Line 53, delete "viylaromatic" and insert -- vinylaromatic --.

Signed and Sealed this

Seventh Day of October, 2003

JAMES E. ROGAN
*Director of the United States Patent and Trademark Office*